United States Patent [19]
Meszaros et al.

[11] Patent Number: 6,130,637
[45] Date of Patent: Oct. 10, 2000

[54] MEASURING THE THICKNESS OF HOT SLAG IN STEELMAKING

[75] Inventors: Gregory A. Meszaros, Pittsburgh, Pa.; Roger Marquart, Valpraiso, Ind.; David J. Walker, Mississauga, Canada; John G. Estocin, Turtle Creek, Pa.; Frank L. Kemeny, Grand Island, N.Y.

[73] Assignee: USX Corporation, Pittsburgh, Pa.

[21] Appl. No.: 09/135,617

[22] Filed: Aug. 18, 1998

[51] Int. Cl.⁷ .................................................. G01S 13/10
[52] U.S. Cl. ........................................ 342/124; 342/123
[58] Field of Search ..................... 342/124, 123; 367/908

[56] References Cited

U.S. PATENT DOCUMENTS

| | | | |
|---|---|---|---|
| 3,080,755 | 3/1963 | Percy | 73/355 |
| 3,663,204 | 5/1972 | Jungwirth | 75/49 |
| 3,701,518 | 10/1972 | Herff | 266/34 LM |
| 4,210,023 | 7/1980 | Sakamoto et al. | 342/124 |
| 4,219,814 | 8/1980 | Johnson | 343/9 R |
| 4,290,067 | 9/1981 | Legille et al. | 343/12 R |
| 4,359,211 | 11/1982 | Baumert | 266/99 |
| 4,858,892 | 8/1989 | Kreuz et al. | 266/99 |
| 5,148,177 | 9/1992 | Nagamune et al. | 342/124 |
| 5,182,565 | 1/1993 | Nagamune et al. | 342/124 |
| 5,629,706 | 5/1997 | Baath | 342/124 |
| 5,827,474 | 10/1998 | Usher et al. | 266/44 |

OTHER PUBLICATIONS

Tezuka and Nagamune "M–Sequence Modulated Microwave Level Meter . . . " 1994 Steelmaking Conference Prodeedings, 181–185.

Robertson "Microwave RAdar Targets Tough Applications" Intech, Mar. 1992 pp. 39–40.

Vega Radar Level Transmitters—Product description SEctions 1–2.7.

Kracich and Goodson "Ladle Slag Depth Measurement" 1996 Steelmaking Conference Proceedings pp. 53–60.

*Primary Examiner*—Ian J. Lobo
*Attorney, Agent, or Firm*—William L. Krayer

[57] ABSTRACT

Radar is used to measure not only the level of slag on molten steel but also its thickness; the measurement is used to calculate the volume of slag, and, in turn the amount of additives for slag treatment.

19 Claims, 6 Drawing Sheets

Heat 1 Raw data

Heat 1 Processed data

Heat 2 Raw data

Heat 2 Processed data

Heat 3 Raw data

Heat 3 Processed data

Combined Raw Data for All 3 Heats

Combined Processed Data for All 3 Heats

MEASURING THE THICKNESS OF HOT SLAG IN STEELMAKING

TECHNICAL FIELD

This invention relates to apparatus and methods for measuring the thickness of slag on the top of a vessel of molten steel or other molten metal. An improved knowledge of the thickness of the slag, and hence its quantity, permits improved control of the amount of iron oxides and other constituents of the slag. The invention therefore includes methods and apparatus for controlling the chemistry of slag in steelmaking vessels. It also encompasses estimating the average top level of the slag, and estimating the volume above the surface of the slag which is available for additions to the vessel.

BACKGROUND OF THE INVENTION

The production of steel is historically a batch process comprising an oxidizing (or basic oxygen process) stage and a refining, or reducing stage. Generally, after the basic oxygen process, the coproduced slag floating on top of the molten steel will have a high iron oxide content and a high manganese oxide content. This slag follows the molten steel when it is poured into ladles and other vessels. The slag must be treated to reduce the iron oxide content.

If the iron oxide content of the slag is not reduced in the process of making aluminum deoxidized steel, the alumina that forms can cause caster nozzle clogging and surface defects. On the other hand, if the slag is excessively deoxidized, such that the resulting sum of iron and manganese oxides is less than 2%, then complex magnesium aluminate spinel inclusions may form. These can also cause nozzle clogging and quality defects. Furthermore, if too much slag reducing agent is added, the steel chemistry may be changed and miss the product specifications. The operators must also be aware if there is not enough free volume, or "freeboard" above the slag to accommodate the additional volume of slag treating agents to be added.

Although the concentration of iron oxide in the slag may be determined reasonably accurately, it has been difficult to determine the quantity of slag present, and many approaches have been followed to measure the thickness of the slag in order to decide how much aluminum, calcium carbide, or silicon to add to reduce the iron oxide. For example, a slag depth approximation may be computed from overall weight and the top slag level, since slag density can be determined reasonably accurately.

See Richard E. Kracich and Kenneth Goodson, "Ladle Slag Depth Measurement", 1996 Steelmaking Conference Proceedings, 53–60. In this paper, the authors describe a slag depth measuring system including measuring the lower level of slag by a "slag/steel interface electronics" coil, a probe which must penetrate the slag layer and beyond, where the induction effects of the coil are changed by the presence of the molten steel. Other kinds of probes used in the past include simple steel bars; the bar is inserted until its extremity is melted by the molten steel, and the thickness of the slag is assumed to be the length of the red-hot portion after the bar is pulled out. But frequently the upper crust of the slag does not heat the bar enough. Any device which must penetrate the slag to measure its depth must be expected not to last very long. Moreover, slag depth varies over its area, and the single probe techniques do not account for such variations. Nevertheless, such devices can often be relied upon at least for determination of the upper level of the molten steel, which is relatively constant and can be measured reliably at a single point.

Microwave radar has been used for years to measure the levels of various substances. The basic principle is known that the distance from the radar sender/receiver to the object under scrutiny is directly related to the time expiring between sending and receiving the radar signal, and the distance is accordingly readily computed from the elapsed time. In recent years, smaller and less expensive radar systems have become available, and their accuracy has been improved so that relatively close objects and levels of materials can be measured with confidence. The art has learned to measure or compensate for turbulence as well as unevenness in surfaces. Radar microwave is excellent for measuring a level below a layer of foam, which is otherwise hidden from view. Radar can penetrate the covers of some vessels, such as plastic lids, to determine the level of materials beneath them. The ability of contemporary computers to handle large quantities of data has also expanded the potential for radar usage.

Tezuka and Nagamune, in a paper entitled "M-Sequence Modulated Microwave level Meter and its Application" presented at the 1994 Steelmaking Conference Proceedings, 181–185 describe the measurement of the level of molten iron in a moving car, using a microwave technique; they also measure the top level of slag in a vessel. However, the microwave emissions were not shaped and accordingly a large portion of radiation received represented reflections from the sides of the vessels.

We are interested in determining not merely the upper level of the slag, but the lower level as well, so we can calculate the quantity of slag to be treated with reducing and other materials, such as aluminum or calcium carbide. It may be noted that the above mentioned Kracich and Goodson paper contains the following statement: "A microwave unit for measuring slag depth was tested, but was not feasible due to time constraints, cost and durability in the harsh environment." Our technique has overcome these problems and many others we encountered.

SUMMARY OF THE INVENTION

Radar reflectance is highly dependent on the conductivity and, to an extent, the dielectric constant of the material or surface to be contacted or measured. Highly conductive subjects, such as acids and graphite, reflect microwaves very well, more or less independently of the dielectric constant so that these materials can be measured with few problems. Generally, electrically conductive materials having a dielectric constant greater than 1.5 have sufficiently good reflection characteristics for reliable radar measurement. If the material in question is non-conductive and appropriate dielectric constant is desirable for sufficient reflection. Typically, steelmaking slag has a dielectric constant that will reflect radar sufficiently for a measurement. Compositions of slags vary, but steelmaking slags may be expected to have electrical conductivities $\lambda$ of about $\lambda=0.5$ to $1.5$ $\Omega^{-1}$ $cm^{-1}$ and ladle slags about $\lambda=0.4$ to $0.7$ $\Omega^{-1}$. Steel is generally highly conductive and accordingly strongly reflects radar pulses. Liquid low alloy steel may be expected to have an electrical conductivity of about $\lambda=7140$ $\Omega^{-1}$ $cm^{-1}$ at steelmaking temperatures. The marked difference in conductivity—a factor of about 7000—between slag and molten steel is very favorable for the use of radar to determine the position of the interface of the slag and the molten steel.

Our invention employs a microwave transmitter and receiver, sometimes herein called a transceiver because the antenna which transmits the microwave radiation also receives the reflection, although it is within the concept of our invention to employ two separate antennas. In our preferred mode, the transceiver is deployed temporarily over the vessel containing the molten steel and slag. Microwave radiation is aimed at the center of the vessel preferably shaped in a conical pattern having a base calculated to strike a circular area comprising about 1–80%, and preferably about 50%, of the slag surface.

Some of the microwave radiation is reflected from the slag surface so that the upper level of the slag may be determined, but our invention also recognizes that some of the radiation penetrates the slag entirely and is reflected from the surface of the underlying molten steel. We therefore determine the distance from the radar device of both the upper and the lower surfaces of the slag; the difference is the thickness of the slag, and we determine the quantity of slag present from the calculated thickness and the dimensions of the vessel. We need not use separate radiation emissions for the upper and lower surface determinations.

Whether we use a single transmission for the upper and lower surfaces of the slag, or separate transmissions of different frequencies chosen for optimum reflectivity from the slag and steel surfaces, we first, preferably, generate an experiential data base for the computer software which will process the raw echo data. Preferably a data base will be obtained, for example, for each vessel which will hold the molten steel and associated slag. Data may be accumulated particularly to determine false echoes in an empty vessel, and historical data may be compiled for known molten steel/slag levels in the vessel. The software will then be adjusted to discard false and "ghost" echoes, adjust for various conical angles, and otherwise optimize the processing of the received pulses.

The transmissions and echoes are subject to several phenomena which must be interpreted—some of the microwaves are reflected from the surface of the slag, some partially penetrate the slag and are reflected from its interior, and some are reflected from the surface of the molten steel. Other portions of the microwaves may be received as "false" echoes from the sides of the vessel and elsewhere, and will be recognized as such by the computer and filtered out.

We have recognized that the distance profile of the slag printed out by the instruments we use has a characteristic pattern and the distance profile of the molten steel has a quite different characteristic pattern. Whether these patterns are discerned as raw data or as processed data, they will be recognizable by computers or humans and they will be further recognized as juxtaposed with the slag-characteristic pattern on top. We are thus able to determine at least approximately the distance of the slag/steel interface from the radar unit as well as the distance of the slag surface from the radar unit.

The Vega radar unit, working with a computer equipped with "Echofox" software, used to collect the data discussed below generates a rounded cusp immediately adjacent to a level area. The rounded cusp is indicated to be at a distance approximately predictable for the slag, and the left (or high) end of the level portion of the profile is near the approximately predictable distance for the upper level of the molten steel. The characteristic rounded cusp representing the slag is apparently caused not only by the dielectric constant and conductivity of the slag, but also by its multi-faceted and heterogeneous composition, resulting in a dispersion of reflections and possibly minute refractions. The broad base of the rounded cusp is, we believe (although we do not intend to be bound by any theories), a function of the nonuniformity of the surface of the slag. If this is so, the rounded cusp may in part overlap the actual level of the molten steel surface as reported in the computer printouts. The level line characteristic of the molten steel is also an artifact of the software. We are not certain whether the straight line represents actual radar reception from the levels indicated, or is indicative of the absence of data for points below the surface of the steel. It is clear, however, that there are two distinct types of data approximately at the levels above and below the surface of the slag. Thus the point or level at which there is an abrupt change in patterns from a rounded cusp to a level line may represent the slag/steel interface. As indicated above, this is quite consistent with the abrupt change in electrical conductivity from the slag to the molten steel. Of course the data can be manipulated to provide different patterns, but the slag and steel data will be recognizably next to each other, and we can utilize that fact, regardless of how the data are presented, to do our calculations of slag depth. Note that this principle may be followed even if the level line is an artifact of a program or algorithm which causes the level line to be printed even if there is no data—that is, if the radar is completely reflected from the surface of the steel. The software may also manipulate the data to indicate the average upper level of the slag, and may utilize various principles of statistics to present the data in various ways. It is possible, as indicated above, or even likely, that the breadth of the base of the rounded cusp has a positive correlation to the roughness of the topography of the slag, and that the cusp therefore overlaps the actual distance of the interface of slag and steel.

Thus we predetermine the approximate distances from the radar unit for the upper and lower surfaces of the slag, cause the radar unit to emit pulses, record the reflections in a manner to generate a surface distance profile, and correlate the resulting rounded cusp adjacent to a level area to the upper and lower slag surfaces. The positions of these portions of the profile represent the distances from the radar unit.

Slag has been seen to be partially transparent to microwave radiation of frequencies of 5 to 25 GHz; we therefore may employ two separate pulses of different pulse frequencies to obtain distance readings for the upper and lower surfaces. Our preferred microwave frequency when using a single frequency is 6.3 GHz The advantages of using a microwave of 6.3 GHz is that this frequency does not require FCC approval and has a low emitting energy that is not detrimental to humans.

Our invention includes a method of controlling the addition of reducing agents such as aluminum, calcium carbide and/or silicon to the slag which comprises determining the distances from a microwave energy receiver of the upper and lower surfaces of slag, calculating the thickness of the slag and the quantity of slag present from such distances and the dimensions of the vessel, and calculating a desired reducing agent addition based on the quantity of slag present and the concentration of iron oxide, manganese oxide, and/or other oxides in the slag.

More particularly, our invention includes a method of measuring the thickness of slag on molten metal by measuring microwave reflectance (time of flight) from the surface of the slag and microwave reflectance from the surface of molten metal underlying the slag by identifying microwave radiation which is transparent to the slag but reflected from the metal surface. Our invention is not limited to the measurement of slag thickness on molten steel, but may be used in other metallurgical contexts, i.e. in any situation where molten slag or dross is on top of molten metal, including nonferrous metals.

Also more specifically, our invention includes the concept of striking the surface of molten slag with microwave radiation shaped to reflect from a portion of the surface in a predetermined geometric shape. Data representing the reflections from the predetermined geometrically shaped surface area are processed to determine the average distance of the slag surface within it from the radar transceiver, and this average distance is used as the average distance of the entire top surface of the slag. This distance is used in computing the thickness, and the volume, of the slag. The lower level of the slag may be determined for this purpose by radar as explained elsewhere herein or by means other than radar.

DETAILED DESCRIPTION OF THE INVENTION

Figure 1:
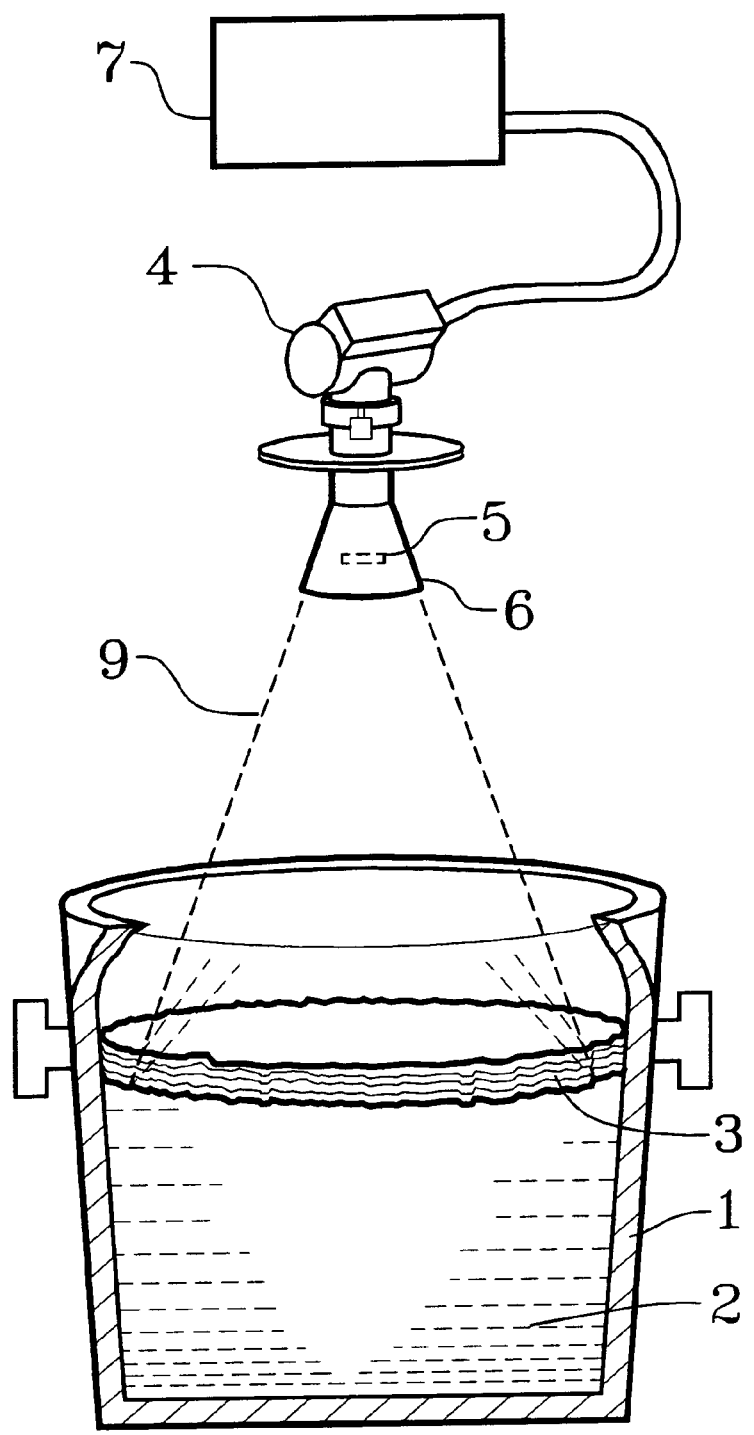
FIG. 1 is a side elevational view showing a vessel of molten steel and slag, and a radar unit overhead for taking readings of slag levels.

In FIG. 1, vessel 1 is on a rail car not shown. Vessel 1 contains molten steel 2 to be poured into a deoxidizing vessel in preparation for use in a continuous caster. Molten steel 2 is covered with a layer of slag 3 of unknown thickness. Overhead is radar transceiver 4 which includes an antenna 5 of polytetrafluoroethylene mounted in in conical waveguide 6. Radar transceiver 4 is connected to computer 7. Conical waveguide 6 guides the microwaves in a divergent, conical pattern 9 prior to striking slag 3.

In practice, the vessel 1 may be moved into position for the slag measurement by the rail car not shown or by a crane or other means. The radar transceiver 4 likewise is movable, and, as discussed elsewhere herein, it is desirable not to expose the unit for long periods to the high temperatures and atmosphere above the vessel. Ideally, the radar transceiver is retractable to a distance completely insulated from the heat of the molten materials so that it may be in its working position a few meters above the molten surface for only a few seconds.

Microwave radar transceiver 4 is an off-the-shelf device which transmits microwave radar pulses from antenna 5 towards a target, in our case a layer of molten slag 3. Portions of the pulses are reflected back to the antenna. The basic calculation of level is distance=speed*time/2. Distance is also a function of the strength of the received signal or echo, which may be expressed in decibels. Microwave electromagnetic waves travel at a velocity of approximaely 300,000 km/sec, such that for a microwave pulse frequency of 5.8 GHz, a distance of 1 meter requires a time of flight of 6.6 nanoseconds. The dimensions of conical waveguide 6 are chosen so that in the circumstances of the particular measurements to be taken, the microwave radiation will strike the slag in a circular pattern in the center of the circular layer of slag, preferably covering about 50% of the surface area. The basic calculation must be adjusted to compensate for the shape of the radiation and the area of the surface it strikes, to filter out reflections from the sides of the vessel, angularity of the surface, and other factors such as possible refractions or scattering by facets in the slag. Such adjustments are built into the presentation of the data below, which include both "raw data" and "processed data". The raw data are not entirely unprocessed, and persons skilled in the art will recognize that the radar echoes received by the antenna may be manipulated in many ways. Indeed, data representing the original emitted signal may be manipulated, for example, by algorithms to ensure the incorporation of the effect of the conical waveguide and/or a historical or experience-based compensation, or filter for the shape of a vessel which is used a number of times.

Figure 2:
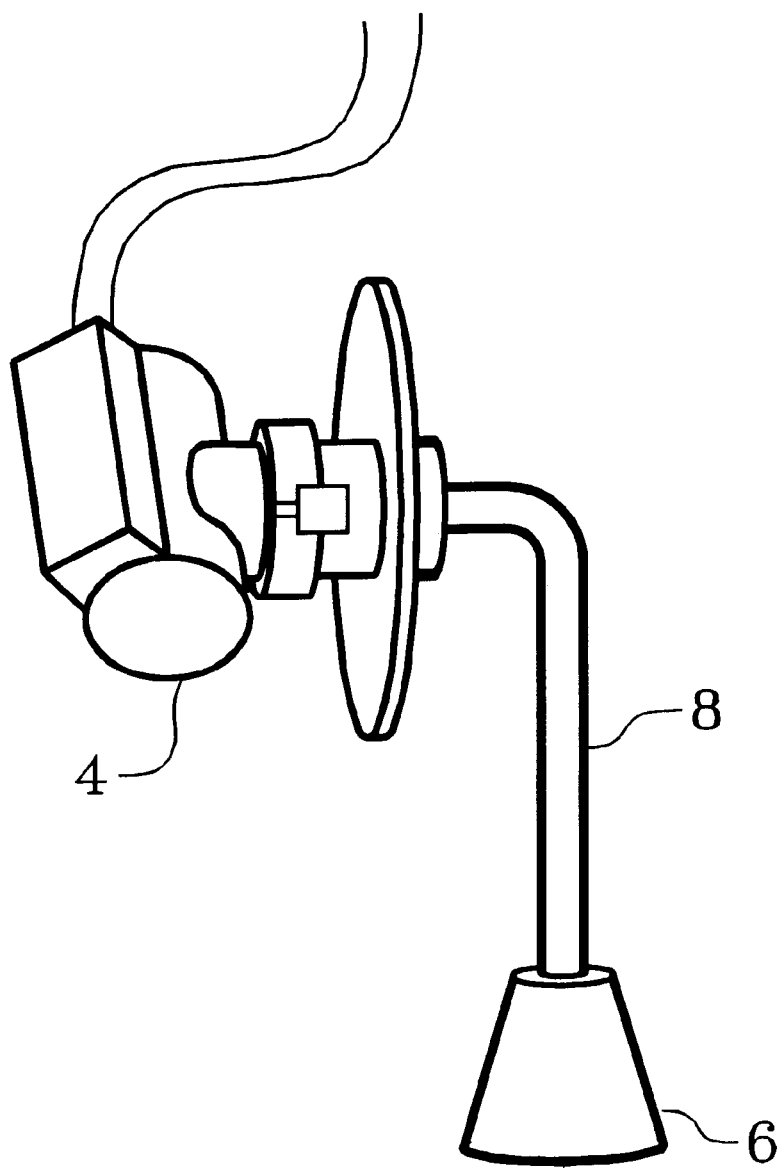
FIG. 2 is a detailed view of the radar system including a preferred waveguide and mechanism for lowering and withdrawing the radar system.

In FIG. 2, a variation of the radar transceiver 4 is shown which includes waveguide extension 8 between the radar transceiver 4 and conical waveguide 6. By the use of the waveguide extension 8, the unit 4 may be made more remote from and protected from the heat and atmosphere in the immediate vicinity of vessel 1 (FIG. 1). The entire assembly, including waveguide 6 and waveguide extension 8 may be retractable by mechanisms not shown.

Measurements were taken on several slag layers and are displayed in FIGS. 3a through 3h. For the tests reported in FIGS. 3a–3h, the emitting frequency was 6.3 GHz. The transceiver used was a VEGAPULS 81 made by VEGA Grieshaber KG, Am Hohenstein 113, Schiltach, Germany, using a horn (conical) antenna made of a heat-resistant alloy. The computer was loaded with ECHOFOX software for processing the data. Both the equipment and the software were obtained from OhmartVega of Cincinnati, Ohio. The apparatus was prepared by following the routines for "learning" false echos and for background and instructions to delete false echos during use. In these plots, the Y axis is expressed in terms of decibels, for the intensity of the reflected signals received by the antenna, but the Y axis units may represent a composite of factors as discussed elsewhere herein. The decibels are correlated to distances in the units on the X axis; the apparatus is thus able to present a repeatable profile, which may be distorted, of the surface(s) struck by the radiation.

The results for the tests conducted on three heats are shown in FIGS. 3a through 3h. For each of the heats we observed the surface of the slag either before or after the measurement. For each measurement, the process car was moved under the radar unit. Measurements were taken until no noticeable change in reading was observed. Both the raw data and processed data were recorded for each heat. While the separate raw and processed data has been included for each of the heats, it is interesting to focus on FIGS. 3g and 3h. These figures are the raw and processed data respectively for each heat combined onto two plots.

Figure 3A:
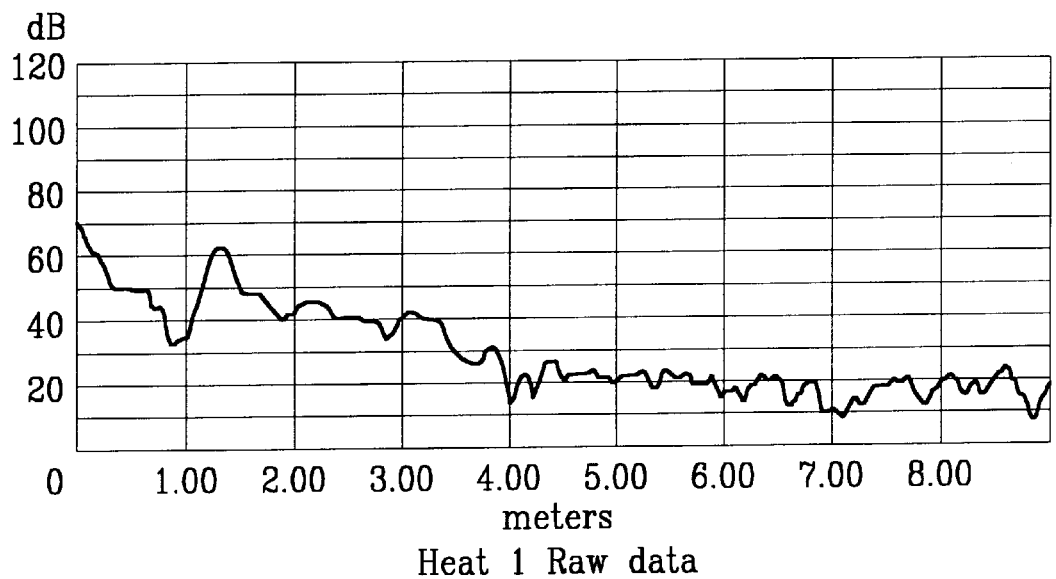
FIGS. 3a–3h are printouts of microwave reflection data showing characteristic patterns in the regions of the slag and the steel.
Figure 3B:
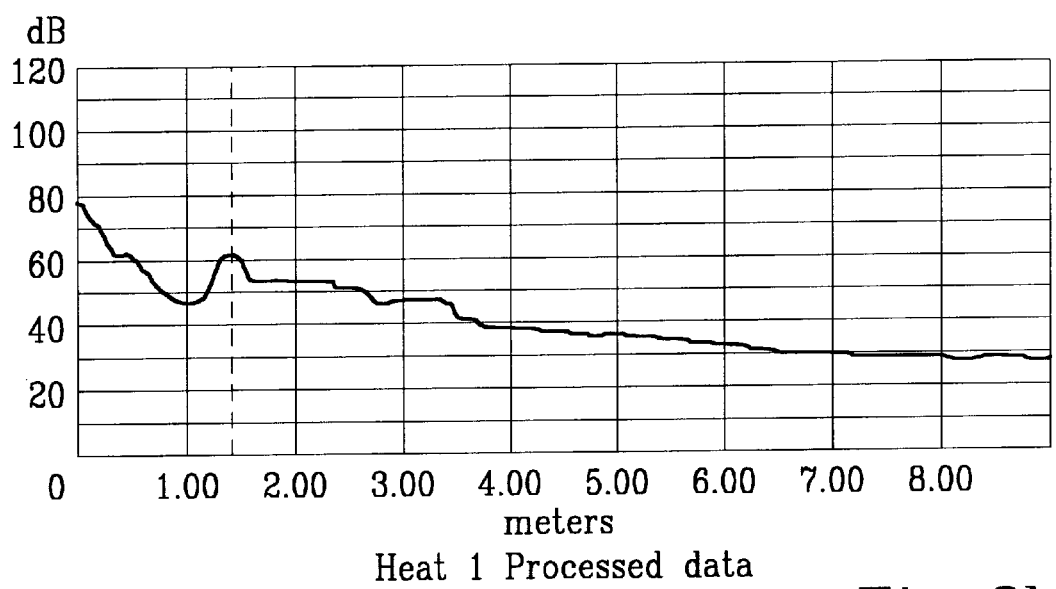
Figure 3C:
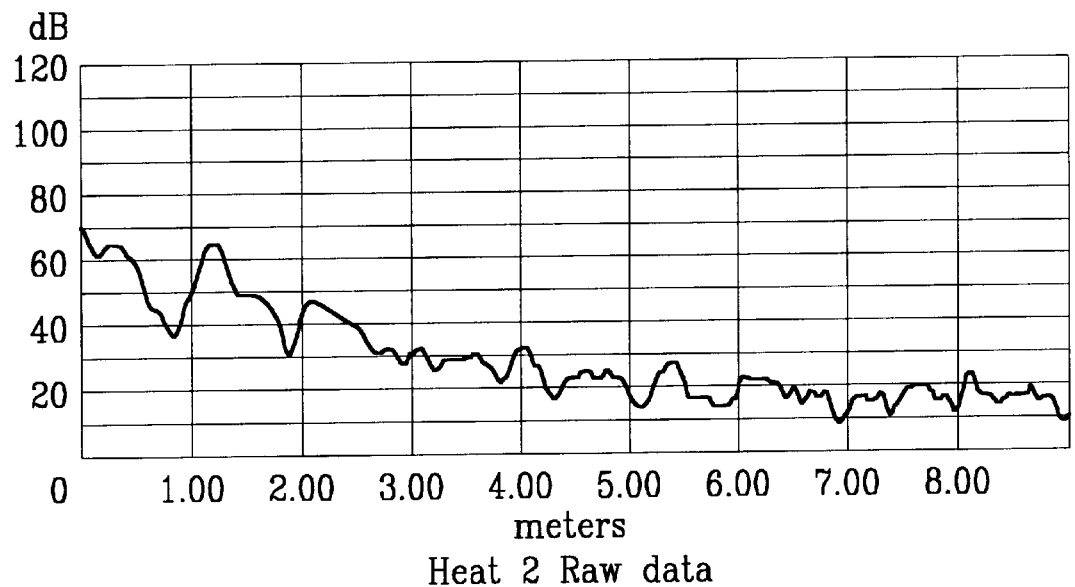
Figure 3D:
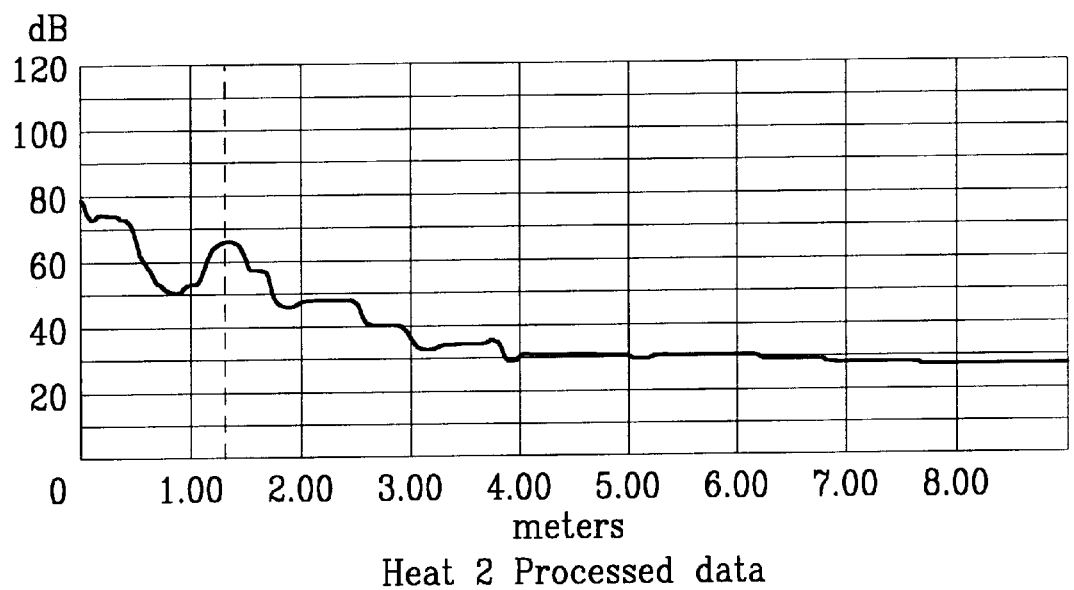
Figure 3E:
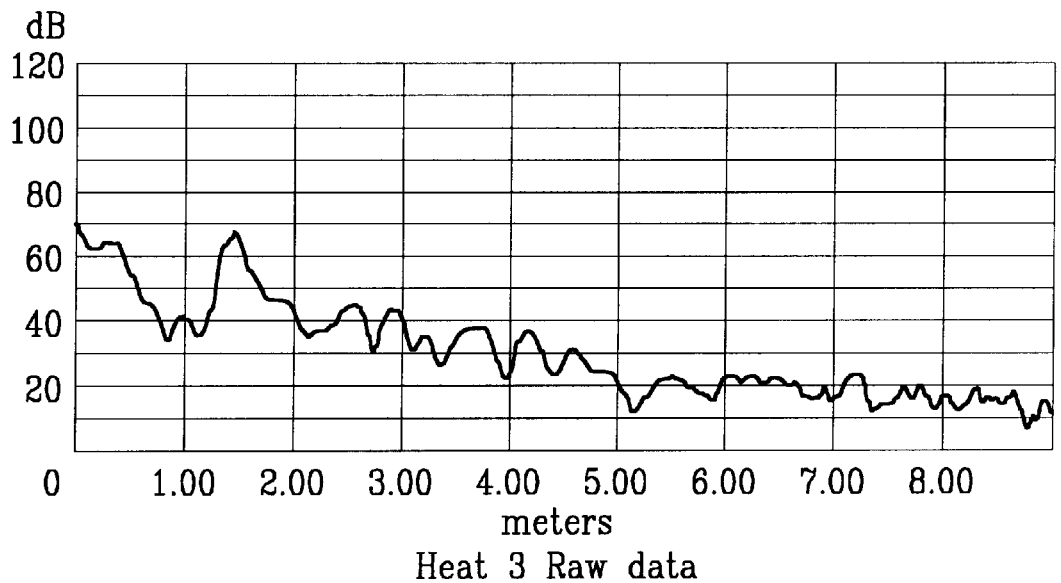
Figure 3F:
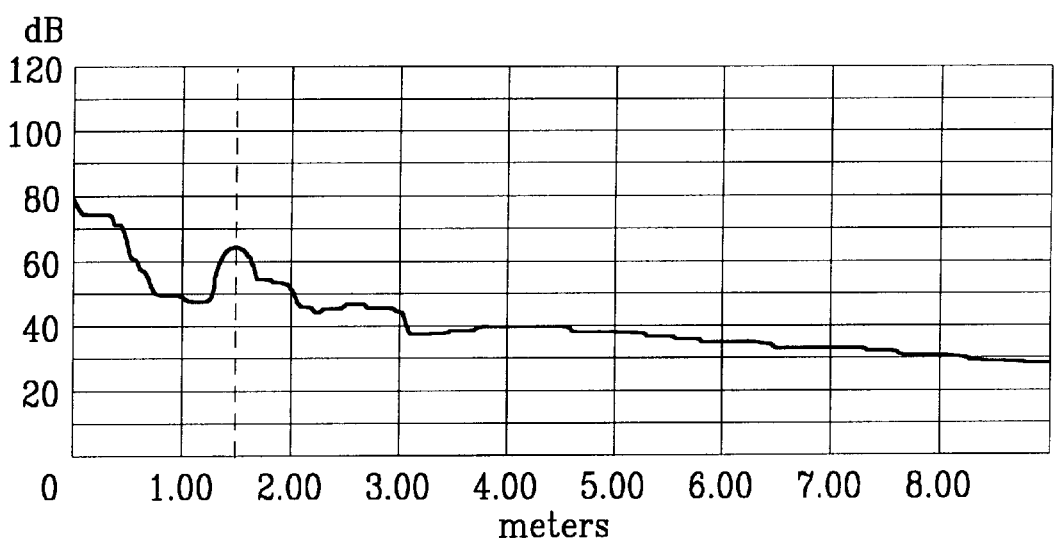
Figure 3G:
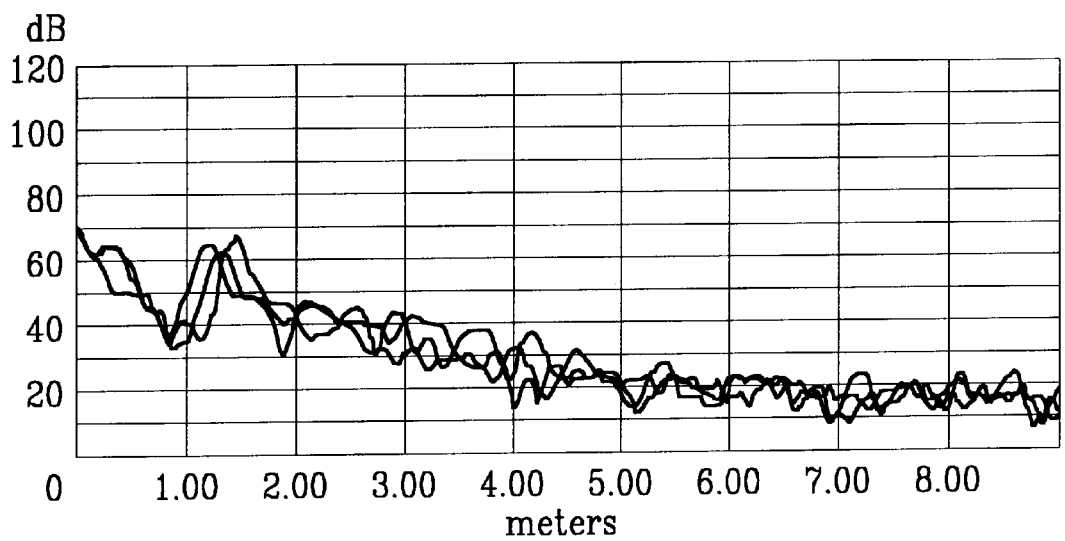
Figure 3H:
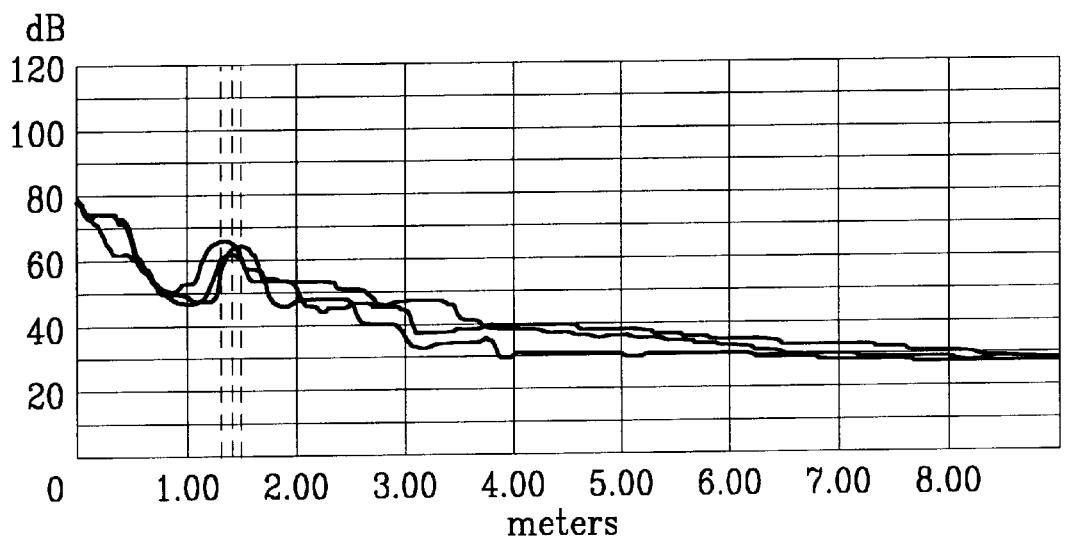

The raw data results in FIG. 3g show that each of the curves is unique in position, height, and width. This indicates that we are able to distinguish between differences in slag height from heat to heat. The processed data results in FIG. 3h show that the curves are similar in height and shape but at different positions. This may indicate slags of similar radar reflectance characteristics but at different heights in the ladle.

Reverting to FIG. 3a, the units on the X axis represent the distance in meters from the reflected surface to the echo signal receiver in the radar unit. The units on the Y axis are expressed in decibels, for the echo signal. The pulsed signal was emitted by the radar unit in a conical fashion as illustrated in FIGS. 1 and 2. For the first heat measured and reported in FIGS. 3a and 3b as raw data and processed data before processing the steel in a degasser, we observed that there was a level between about 1.6 meters and 2.3 meters which was flat, particularly in the processed data of FIG. 3b.

The molten steel is very homogeneous and accordingly it may be assumed, although we do not intend to be bound by any theories, that the microwave radiation penetrated the slag, was reflected from the steel surface and at the same time, by one theory, was reflected uniformly from the incremental depths of penetration through the steel. Thus the horizontal line from about 1.6 to about 2.3 meters in FIG. 3b represents the molten steel, and, particularly important for our purposes, the left end of the line makes a clear intersection with the right bottom of the rounded cusp. A vertical dashed line has been inserted at about 1.4, the peak of the rounded cusp of slag data. Regardless of whether the straight line represents a constant amount of reflection from all levels of the molten steel, it is clear that its uppermost end is the first readily recognizable level of the molten steel, and will be so recognizable by virtually any method of presentation of the data.

However, because the broad base of the rounded cusp may be indicative of an uneven topography for the slag, we believe the actual level of the steel might lie somewhere within the right half of the rounded cusp.

A similar result was seen in the second test of a heat on a transfer car, as shown in FIGS. 3c and 3d, which represents a measurement after degasser processing of the steel. FIGS. 3e and 3f are measurements taken before degassing, and likewise in FIG. 3f, the characteristic lobe at about 1.5 meters represents the slag and the level area to its right represents the steel, but we are not certain of their precise distances.

The reader will appreciate that our invention provides an average depth measurement over a large area—that is, the radar signals are read from a large area and the computer processes the distance readings as an average. Such an average over a large portion of an area is far superior to the single point measurement provided by a probe. Appropriate correlations to the distance profile can be used by the computer to determine factors such as slag density and surface roughness, and/or these factors can be provided to the computer as inputs to assist in the calculations of thickness. Standard deviations of slag levels and volumes can also be calculated.

Whenever it is deemed desirable, we may use our method of determining the average top surface level of the slag together with more conventional methods of determining the top level of the steel. For example, while the steel rod method of estimating the thickness of the slag is sometimes unreliable because of the topography of the slag and the possibility that the top of the slag may not be hot enough to cause the rod to glow red, the steel rod can usually accurately measure the top level of the molten steel because the lower end of the rod will not survive immersion in the molten steel and the surviving length of rod can be used to determine the level of molten steel, Accordingly this measurement combined with our method of averaging the level of a large portion of the top surface of the slag can readily and accurately be used to calculate the volume of slag.

Our system may also be used to determine the "freeboard", or vessel volume above the slag which is available for additional materials such as deoxidizing agents. For this purpose, we determine the difference between the height of the top of the vessel and the top surface of slag, averaged as explained above, and use the result as a factor together with the dimensions of the vessel to determine the volume available.

What is claimed is:

1. Method of determining the distance of slag from a radar transceiver comprising (a) directing at least one radar beam pulse from said radar transceiver toward said slag to strike about 1% to about 80% of the surface of said slag, (b) collecting echoes of said at least one radar beam pulse from said surface and (c) converting said echoes to time-of-flight data for computing the average distance of said surface from the level of said radar transceiver.

2. Method of determining the level of molten steel under a layer of slag of unknown thickness comprising directing one or more pulses of microwave radiation from a radar transceiver to a location above said slag to strike about 1% to about 80% of the surface of said slag, receiving one or more pulses of microwave reflections from said steel, measuring the time of flight of radiation reflected by the surface of said steel to said location, and converting said time of flight to a distance from said radar transceiver.

3. Method of claim 2 wherein said microwave radiation has a frequency from about 5 to about 25 GHz.

4. Method of claim 2 including disregarding false echoes in said microwave reflections.

5. Method of determining the thickness of molten slag on molten metal comprising determining the distances of the tops of said slag and said molten metal from a radar transceiver using one or more pulses of radar from said radar transceiver directed to strike about 1% to about 80% of the surface of said slag, and subtracting the distance from the top of said slag from the distance to the top of said molten metal.

6. Method of determining the thickness of slag on a substantially horizontal molten metal surface comprising transmitting and receiving radar signals using a radar transceiver coupled to a computer to generate data representing a distance profile of said molten metal surface and the upper surface of said slag identifying the resulting profile portion characteristic of slag adjacent to the profile portion characteristic of molten metal, interpreting said profile portions to determine the distances of said slag surface and said molten metal surface, and subtracting the distance for said slag surface from the distance for said molten metal surface.

7. Method of claim 6 wherein said molten metal is steel.

8. Method of claim 6 wherein said profile portion characteristic of said slag is a rounded cusp.

9. Method of claim 6 wherein said profile portion characteristic of said molten metal is a horizontal line.

10. Method of claim 6 wherein said radar signals are shaped to strike from about 1% to about 80% of the area of said top surface of said slag.

11. Method of claim 10 wherein said radar signals are directed to strike about 50% of the area of the top surface of said slag.

12. Method of claim 6 wherein said distance profile is generated by a computer which includes as a factor in its computations at least one of (a) slag conductivity, dielectric constant, refractivity or heterogeneity (b) a factor for averaging distance inputs from a plurality of points on said surface, (c) the frequency of the microwave radiation, (d) reflections from the sides of a container for said molten metal, (e) historical or experiential data representing the radar characteristics of the particular container for said molten metal, and (f) historical or experiential data representing previous similar distance measurements.

13. Method of claim 6 further including computing the volume of slag in said vessel, utilizing the dimensions of said vessel as a factor.

14. Method of claim 6 wherein said identifying, interpreting and subtracting are performed by said computer and the thickness of the slag is displayed by said compuuter.

15. Method of claim 14 further including the step wherein said computer computes and displays the volume of said slag.

16. Method of claim 15 further including the step wherein said computer computes the amount of deoxidizing agent required for said slag.

17. Method of deoxidizing molten slag on molten steel comprising measuring the thickness of said slag at least partly by detecting juxtaposed distance profiles of the surfaces of said molten slag and said molten steel generated by a computer using radar time-of-flight data obtained from one or more radar pulses directed at said molten slag, calculating the volume of said slag as a function of said thickness, and adding deoxidizing agents to said slag as a function of said volume.

18. Method of determining the volume in a vessel available above the surface of slag on a molten metal comprising determining the distance from a radar source to the surface of said slag using one or more radar pulses from said radar source directed to strike about 1% to about 80% of the surface of said slag, determining the difference between said distance and the distance from said radar source to the effective top of said vessel, and computing said available volume from said difference and the dimensions of said vessel.

19. Apparatus for metallurgical processing comprising a vessel for holding molten metal and slag, a radar transmitting and receiving device positioned above said vessel, a computer connected to said radar device, and software associated with said computer for processing radar data to compute the thickness of said slag on said molten metal at least partly by identifying a juxtaposition of distinct distance profiles in time-of-flight radar data.

* * * * *